H. B. WEAVER.
OMNIBUS CONTROL SYSTEM.
APPLICATION FILED MAY 17, 1917.

1,292,547.

Patented Jan. 28, 1919.

INVENTOR
Harold Bready Weaver
by
Edwards, Sager & Richmond.
HIS ATTORNEYS

UNITED STATES PATENT OFFICE.

HAROLD BREADY WEAVER, OF NEW YORK, N. Y., ASSIGNOR TO AMERICAN MOTORBUS CORPORATION, A CORPORATION OF NEW YORK.

OMNIBUS-CONTROL SYSTEM.

1,292,547. Specification of Letters Patent. Patented Jan. 28, 1919.

Application filed May 17, 1917. Serial No. 169,374.

*To all whom it may concern:*

Be it known that I, HAROLD B. WEAVER, a citizen of the United States, residing at New York, in the county of New York and State of New York, have invented certain new and useful Improvements in Omnibus-Control Systems, of which the following is a specification.

This invention relates to vehicles such as motor omnibuses and particularly to the control of the distribution of a number of such vehicles on a given route. The object of the invention is to provide means for producing and maintaining a proper relative spacing among the individual vehicles under all conditions so as to give a maximum effective service for the whole route at all times.

Control of the distribution of omnibuses on a route has formerly depended on verbal instructions given the drivers by starters at various points along the way, but this has proven insufficient and ineffective because it leaves too much to the driver's discretion and calculation. A starter's direction to "go slow" or "make up ten minutes" does not tell the driver how slow to go or how fast to go to gain ten minutes or how to distribute the gain evenly over the trip. Furthermore, the starter's instructions are not always correctly understood and remembered, and since it is practically impossible to check up the driver's obedience to instructions there is a constant opportunity for the drivers to hide their failure to obey orders by misinterpreting and misrepresenting their former instructions when questioned by a subsequent starter, thus misinforming the latter and causing further confusion.

According to the system of the present invention, in place of the highly unreliable verbal instructions of the starter, each omnibus is provided with an automatic indicating device which continually informs the driver at a glance just how far he is ahead of or behind his intended position on the route. Each device carries a card bearing a diagram of the route on which prominent points like streets are indicated by successive lines and along this diagram a pointer representing the omnibus has constant relative movement. The desired location of the omnibuses on the route are indicated by the positions of the pointers on their respective diagrams and the drivers have but to control their relative speeds accordingly to keep in practically perfect correspondence with their schedules and maintain proper spacing throughout the route. The diagram cards are removable and replaceable and by providing a number of cards with different spaced lines the indicated desired speed of the vehicle is increased or diminished as conditions demand. Verbal instructions are unnecessary; the starters simply insert the indicator cards having the lines of their diagrams spaced to indicate the desired rates of the respective vehicles. Each driver then has before him a graphic representation of the intended progress of his car and he can determine at a glance how much he is ahead or behind by comparison of the position of the pointer on the diagram with the location of the car on the route. The starters at subsequent points will be accurately informed as to the speed required by conditions of the former part of the route and can readily compare the driver's performance with his instructions. Temporary disablement of one of the omnibuses or other disturbances of normal conditions do not necessitate rearranging the timing of the other cars so as to disarrange the schedule of the system as a whole; but a gap may be filled in or a too close spacing widened out by retiming the adjacent cars and a constant accurate corrective influence may be at all times exerted on each unit of the system.

In the accompanying drawings.

Figure 1:
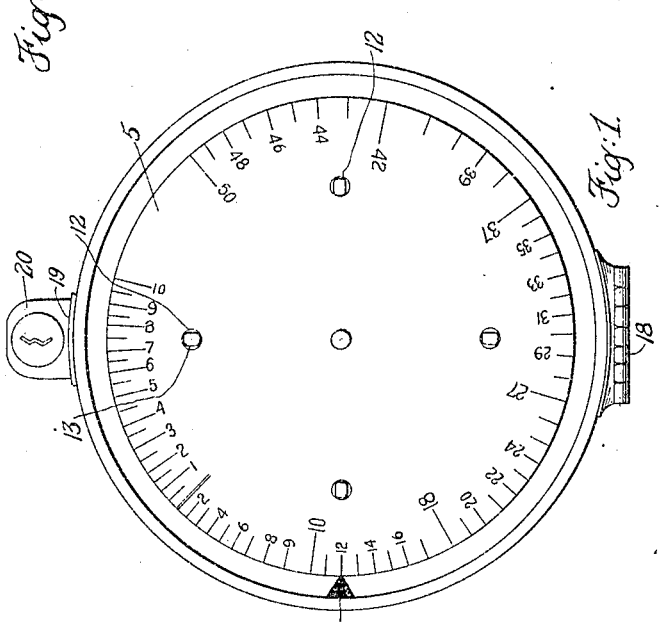
Figure 1 is a face view of one of the timing devices provided for each omnibus.
Figure 2:
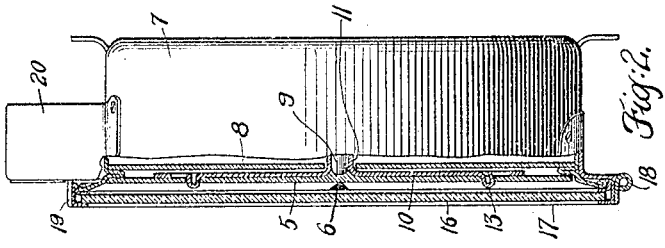
Fig. 2 is a side elevation of the timing device shown in Fig. 1, with parts broken away in central vertical section.

In the timing device shown in Figs. 1 and 2, a circular disk card 5 is rotated clockwise so that its edge moves at constant speed past a fixed point indicated by arrow head 6. To support and rotate the card clock mechanism of ordinary construction is provided in casing 7 having front plate 8 through a central aperture of which projects spindle 9 rotated by the clock mechanism at a speed which for convenience may be that of the minute hand of a clock. The support 10 for the card 5 is fastened to the spindle 9 by a sleeve 11, having frictional engagement with the spindle to permit the support and card to be rotated thereon for adjustment. The card 5 is held on the support 10 by engagement of its recesses 12 over projections 13 on said support. Rotation of the support, therefore, carries the card around with it and moves its edge past the arrow head 6. Along the edge of the card there extends a diagram of the vehicle route comprising a series of lines representing fixed points along the route and spaced apart at proper distances so that each line will be brought by the movement of the card opposite the arrow head 6 at the time that the vehicle should be at the point represented by the line.

The card 5 is locked in place on its support and protected against tampering or adjustment on the part of the driver by the glass face plate 16 held in a circular frame 17 hinged at 18 and provided at its upper end with the latch 19 held in closed position by the lock 20. Only the starters have keys fitting lock 20 so that the control and adjustment of the schedule cards are entirely in their hands, and each starter will be provided with sets of cards covering the sections of the route controlled by him. It is, therefore, impossible for the omnibus drivers to misrepresent their instructions, and their performances can be accurately and quickly checked up by each starter.

In practice, an omnibus A at the starting point street 1 (see diagram Fig. 4) will be provided with a card, as indicated in a circle above, bearing a diagram suited to the trip ahead. If the omnibus has some time to wait before commencing its trip the starter will adjust the card, turning it and its support on spindle 9 to bring the arrow head 6 ahead of the starting line numbered 1 by the number of seconds that the omnibus is to wait. To enable the period of waiting to be accurately determined the card 5 is provided with a series of minute marks $a$ in advance of the starting point 1 and, therefore, at A in Fig. 4 the car will be held five minutes before starting. By this means a starter is enabled to fully take care of each car by one inspection whether the car arrives ahead of time or not. He simply inserts the proper card and sets it back so that the starting point will reach the arrow at the correct starting time. When the starting point numbered 1 reaches the arrow the driver starts on his trip and times his progress according to the travel of the arrow 6 along the lines of the diagram. Where the fixed points of the route are near together or high speed is attainable by the omnibus the diagram lines will be correspondingly closely spaced as those numbered 1 to 6 (Fig. 1) to permit the driver a relatively short time to cover this part of the trip; and vice versa, where the lines are widely spaced as those numbered 36 to 44, the corresponding fixed points of the route are either far separated or only a low speed is attainable. Various points along the route may be distinguished by the character of the lines as shown in Fig. 1, where lines numbered 1, 7, 10, etc., are lengthened to indicate, for instance, points where the omnibus must stop irrespective of passenger signals.

Figure 3:
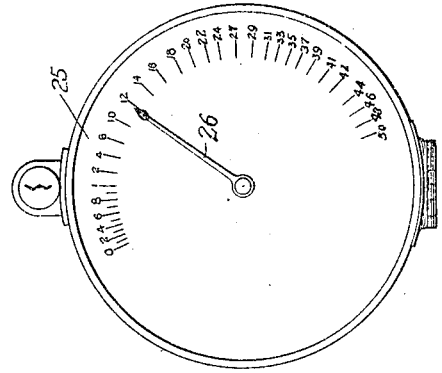
Fig. 3 is a face view of a modification.

The overall length of the card diagram will be determined by the total time in which the particular trip is to be made, a longer diagram indicating a slower trip and a shorter diagram a faster trip. In Fig. 3 a modified type of timing card is shown comprising an annular ring 25 situated around the circumference of the face of the timing device and having the movable hand or pointer 26 traversing its inner periphery at constant speed to indicate to the driver the progress of the omnibus along its route. The velocity of the pointer 26 being the same as that of disk 6 in Fig. 1, it is apparent that the diagram of card 25 represents a much faster trip than the diagram of Fig. 1 for the distance between the starting point numbered 1 and the terminal numbered 50 is less than half of the circumference as compared with the three-quarters of circumference between these points and the diagram of Fig. 1. The rate of travel of the omnibus according to the schedule 25 will be correspondingly increased and it is to be noted that this change of speed is automatically distributed over every part of the trip without calculation on the part of the driver. He is not burdened with the responsibility of making up a certain amount of time on the trip and determining the proper speed at each point of the trip correspondingly but is simply asked to follow the progress of the pointer on his schedule. Where a particularly fast trip is to be made it may be desirable or necessary to omit certain stops in case there is any tendency to fall behind the schedule. The stops to be omitted may be indicated by the character of the lines on the card diagram or by their omission altogether from the diagram, as numbers 3, 5, etc. of diagram 25. The following omnibus will then carry a diagram calling for all stops or indicating omitted stops different from those on the diagram of the preceding machine. In this way it is possible to accurately and completely control the distribution of the omnibuses throughout the route. Disturbances due to accidents and emergencies are quickly remedied, and a maximum effective service throughout the whole route is consistently maintained.

Figure 4:
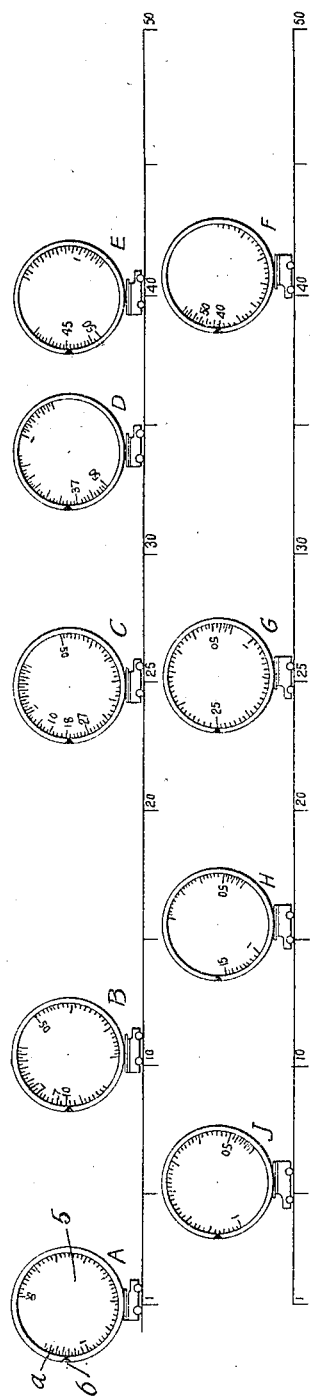
Fig. 4 is a diagram of an omnibus system controlled in accordance with this invention.

Illustrative of the working of the system of this invention in overcoming disturbances to normal conditions of traffic, diagram Fig. 4 shows, in addition to the car A waiting to start at point 1, the car B on time at point number 11 of the route, as shown by the position of the arrow head of its indicator represented by the circle above the car. The car C has arrived at the midway point number 25 ahead of its schedule, as is clearly apparent to the starter stationed here. The car D has just been given a schedule diagram much shorter than the assumed normal three-fourths of the circumference and is thus being speeded up to pass and fill the gap ahead of the car E, which has been slowed down behind its schedule by impairment of the driving mechanism. Car F on return trip from the end starter station numbered 50 is on time. Car G as indicated has been given a slow schedule to widen the gap between it and the car H, which has returned into the circuit at midway point 25 from being temporarily disabled and is speeded up by its short schedule diagram to take an average position intermediate car G and the preceding car J, which is soon to arrive at the starting point numbered 1 to replace car A about to depart. It is to be noted that the drivers of the omnibuses have nothing left to their discretion and are freed entirely from the necessity of calculating even amid the complicated disturbances above assumed. The speeding up and the slowing down of each omnibus is automatically distributed over each point of the schedule diagram, and the driver may at a glance determine just how far he is behind or ahead of his correct position.

Each schedule card may have a diagram on each side, as one for the up and one for the down trip, and other directions may be embodied in the diagrams, or where permissible a full closed circuit may be represented on each side of the card, the opposite sides of the card having differently timed schedules. The arrow 6 or the diagram of card 25 may be located at any convenient part of the circumference, and it is apparent that an equivalent control of the speed of each omnibus may be obtained by varying the rate of movement of the pointer with respect to the lines of the diagram. The invention is not confined to the specific embodiments shown but is intended to cover such modifications thereof as come within the scope of the appended claims.

Having thus described my invention, I declare that what I claim as new and desire to secure by Letters Patent, is:—

1. A timing means for an omnibus, comprising a support mounted on the omnibus and rotating at constant angular velocity and adapted to receive a schedule card movable with said support, a detachable schedule card having a series of indications around its periphery spaced apart proportionately to the desired running time between successive fixed points on a given route, and an annular space surrounding said card and having a pointer in fixed position adjacent said series of indications, and means permitting setting of said indications in any relative starting position with respect to said pointer so that the movement of said route indications past said fixed pointer will indicate the desired passing of the indicated route points with respect to the omnibus.

2. The method of starting and controlling a plurality of cars on a regular route which consists in driving route dials by clocks relatively to respective pointers on the respective cars, and on each car replacing a dial from time to time by another with a more or less crowded scale according as the progress of the car is desired to be accelerated or retarded compared with the schedule of the replaced dial.

3. In a traffic system comprising a plurality of cars on a regular route with a driver on each car and several starters stationed at points along the route, the method of starting and controlling the drivers by the starters which consists in driving route dials by clocks relatively to respective pointers on the respective cars, said dials being inaccessible to the drivers but accessible to the starters, manually adjusting said dials relatively to the pointers by the starters, and replacing the dials individually from time to time by the starters by other dials having more or less crowded scales according as conditions require the acceleration or retardation of the respective cars.

HAROLD BREADY WEAVER.

Copies of this patent may be obtained for five cents each, by addressing the "Commissioner of Patents Washington, D. C."